US011983609B2

(12) United States Patent
Carrasco

(10) Patent No.: US 11,983,609 B2
(45) Date of Patent: May 14, 2024

(54) DUAL MACHINE LEARNING PIPELINES FOR TRANSFORMING DATA AND OPTIMIZING DATA TRANSFORMATION

(71) Applicant: Sony Interactive Entertainment LLC, San Mateo, CA (US)

(72) Inventor: Serge-Paul Carrasco, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 997 days.

(21) Appl. No.: 16/507,835

(22) Filed: Jul. 10, 2019

(65) Prior Publication Data

US 2021/0012236 A1  Jan. 14, 2021

(51) Int. Cl.
*G06N 20/00* (2019.01)
*G06N 5/04* (2023.01)

(52) U.S. Cl.
CPC ............. *G06N 20/00* (2019.01); *G06N 5/04* (2013.01)

(58) Field of Classification Search
CPC .......... G06N 20/00; G06N 5/04; G06N 5/025; G06N 99/005; G06N 3/006; G06N 3/08;
(Continued)

(56) References Cited

U.S. PATENT DOCUMENTS 6,493,686 B1  12/2002  Francone et al.
6,601,233 B1   7/2003  Underwood
(Continued)

FOREIGN PATENT DOCUMENTS

CN   107870902 A   4/2018
CN   108460489 A   8/2018
(Continued)

OTHER PUBLICATIONS

Crandall, "Learning to compete, coordinate, and cooperate in repeated games using reinforcement learning", 2011. (Year: 2011).*
(Continued)

*Primary Examiner* — Dave Misir
(74) *Attorney, Agent, or Firm* — John L. Rogitz; John M. Rogitz

(57) ABSTRACT

An end-to-end cloud-based machine learning platform providing two data pipelines: a first machine learning pipeline provides data transformation, a second machine learning pipeline optimizes those data transformations. The first pipeline transforms raw data into model features, and features into machine learning models. It provides training, inference, and experimentation of online and off-line models for personalizing experiences for game players. The second pipeline optimizes models generated by the first pipeline leveraging a reinforcement learning (RL) model and an evolution strategy (ES) model. The second pipeline learns with its first RL model, from experimentation, the best performing models. To improve the training of new models, the second pipeline also transfers its learning from its first RL model to its second ES model to generate the training of new models in the first pipeline. The second pipeline can be considered as an overlay pipeline to the first one.

15 Claims, 11 Drawing Sheets

(58) Field of Classification Search
CPC .... G06N 3/084; G06N 3/0454; G06K 9/6256; G06K 9/6269; G06K 9/6267; G06K 9/6218; G06K 9/62; G06K 17/30542; G06K 17/30011; G06K 17/30247; G06K 17/30286; G06K 17/30592; G06K 17/30563; G06K 17/30569; G06K 17/30595; G06Q 10/00

See application file for complete search history.

(56) References Cited

U.S. PATENT DOCUMENTS

| | | | |
|---|---|---|---|
| 6,615,166 | B1 | 9/2003 | Guheen et al. |
| 2005/0065753 | A1 | 3/2005 | Bigus et al. |
| 2006/0059253 | A1 | 3/2006 | Goodman et al. |
| 2010/0138026 | A1 | 6/2010 | Kaushal et al. |
| 2014/0377727 | A1 | 12/2014 | Yom-Tov et al. |
| 2015/0100530 | A1* | 4/2015 | Mnih ............ A63F 13/67 706/25 |
| 2015/0379429 | A1 | 12/2015 | Lee et al. |
| 2017/0330109 | A1 | 11/2017 | Maughan et al. |
| 2018/0351981 | A1 | 12/2018 | Muddu et al. |
| 2018/0357552 | A1* | 12/2018 | Campos ............ G06N 5/043 |
| 2019/0025773 | A1 | 1/2019 | Yang et al. |
| 2019/0102700 | A1* | 4/2019 | Babu ............ G06N 5/025 |
| 2019/0102706 | A1 | 4/2019 | Frank et al. |
| 2019/0156247 | A1* | 5/2019 | Faulhaber, Jr. ........ G06N 20/00 |
| 2020/0034435 | A1 | 1/2020 | Norouzi et al. |
| 2020/0034665 | A1* | 1/2020 | Ghanta ............ G06K 9/03 |
| 2020/0193313 | A1* | 6/2020 | Ghanta ............ G06N 5/046 |
| 2020/0366699 | A1 | 11/2020 | Sampaio et al. |
| 2020/0382968 | A1* | 12/2020 | Gupta ............ H04W 28/02 |
| 2021/0256403 | A1 | 8/2021 | Tang et al. |

FOREIGN PATENT DOCUMENTS

| | | |
|---|---|---|
| TW | 201202876 A | 1/2012 |
| TW | 201812646 A | 4/2018 |
| WO | 2019029046 A1 | 2/2019 |

OTHER PUBLICATIONS

Liao, "CS229 Final Report Reinforcement Learning to Play Mario", 2012. (Year: 2012).*

Crandall, "Learning to compete, coordinate, and cooperate in repeated games using reinforcement learning", 2011. (Previously supplied). (Year: 2011).*

Liao, "CS229 Final Report Reinforcement Learning to Play Mario", 2012. (Previously supplied). (Year: 2012).*

Carrasco et al., "Self-Healing Machine Learning System for Transformed Data", related U.S. Appl. No. 16/512,119, Applicant's response to Preinterview office action filed Feb. 5, 2021.

Carrasco et al., "Self-Healing Machine Learning System for Transformed Data", related U.S. Appl. No. 16/512,119, Preinterview office action dated Jan. 6, 2021.

International Search Report and Written Opinion dated Sep. 24, 2020 from the counterpart PCT application PCT/US20/38190.

Hochreiter et al., "Long Short-Term Memory", Neural Computation 9(8): 1735-1780, 1997.

Mnih et al., "Playing Atari with Deep Reinforcement Learning", DeepMind Technologies, Dec. 2013.

Salimans et al., "Evolution Strategies as a Scalable Alternative to Reinforcement Learning", OpenAI, Sep. 2017.

* cited by examiner

PIPELINE P2 - CL MODEL CLASSIFICATION

DUAL MACHINE LEARNING PIPELINES FOR TRANSFORMING DATA AND OPTIMIZING DATA TRANSFORMATION

FIELD

The application relates generally to technically inventive, non-routine solutions that are necessarily rooted in computer technology and that produce concrete technical improvements. In particular, the present application relates to end-to-end cloud-based machine learning platforms providing personalized game player predictions.

BACKGROUND

Machine learning can be classified into different tasks such as supervised learning, unsupervised learning, deep learning, reinforcement learning, and recommender systems, that can be used for a wide variety of computer applications such as online personalized recommendations, computer vision, speech recognition, Internet search engines, personal assistant, and self-driving cars.

As understood herein, machine learning systems resist analysis from formal methods. Due to the complexity of the machine learning systems, verification technologies such as for instance model checking or theorem proving cannot be applied to machine learning systems. As a result, the behaviors of machine learning models must be determined empirically through controlled experiments to support, refute, or validate a market hypothesis.

The importance of validating market hypotheses in computer simulation fields such as computer games is complicated by the fact that game developers constantly innovate by re-imagining how people play games, while game players have ever changing behaviors regarding how they interact, consume, and purchase games. This implies that many machine learning personalization models must be developed and validated in relatively short life cycles.

SUMMARY

As understood herein, machinelearning is a serialized process that involves identifying, obtaining, and preparing the raw data sets, feature engineering and generating extract, transform, and load (ETL) services that transform the raw data into features for the machine learning models, and designing and developing the machine learning models themselves. The models must be "trained" in a computing-intensive task that consequently involves distributed computing architectures running on a large number of central processing units (CPUs), graphics processing units (GPUs), and emerging optimized chips for running specific algorithms such as deep learning. The models must then be evaluated for performance and latency. After a model is trained, the quality of its prediction and the time it takes for that model to provide that prediction needs to be evaluated. A "good" model can then be deployed in a production environment for providing inferences in an online service such as a Web store, a user news feed, an activity within a game, or a tip system to help game users to better play.

As also understood herein, to relieve data scientists from building their own modeling tools to automate these workflows, machine learning pipelines can be used to automate the above workflows from end-to-end. Such end-to-end pipelines transform raw data into features, which are then transformed into models that are trained, and deployed into production for generating inferences. Machine learning pipelines insure reliable, uniform, and reproducible data transformations for generating feature ETLs, training models, and providing in production model inferences.

Present principles further understand that machine learning pipelines may have two different types of data processing infrastructure. The first is an infrastructure to support high data throughput. Machine learning models must be trained with very computing-intensive algorithms such as in particular batch gradient descent. Gradient descent aims to minimize the cost or loss function between the labels data of the training set and the model predictions. Finding the minimum of the cost function requires a lot of computing iterations in particular for training deep learning systems. As a result, the training service of the pipeline generally runs or large number of CPUs, GPUs, and emerging optimized chips for running specific algorithms such as deep learning, and that training can be evenly distributed over a large number of clusters. That training service is mostly an off-line pipeline although some models for certain use cases, must be trained online.

The second type of data processing infrastructure must support low data latency. When the model is trained, the model provides its prediction with very low latency in the range of a few milliseconds for a large number of requests. The inference service is often online as model predictions are provided to applications on-demand but can also be off-line as model predictions are scheduled to run on a weekly, daily, or hourly basis.

Present principles address the technological need recognized herein to remove human decision-making from initial model creation, the decision of which model to train and when to train it, which and why a model can be deployed in production, and which and why a model succeeds in an experiment. Further, present principles allow non-data scientists to train models by automating in particular the search of the model hyperparameters, and the selection of an algorithm that is known to work with open source data sets.

Accordingly, present principles relate to how a machine learning pipeline transforms data. Raw user interaction data and raw item data are transformed into generating features. The models learn with those features how to provide personalized software experiences such as a recommendation of a computer game to given user, recommendation of a tip to a user to better play, recommendation of a game activity to a user, etc, The model predictions are used to evaluate various experiments about those recommendations. Each experiment has multiple variants.

Accordingly, an apparatus includes at least one processor and at least one computer storage that is not a transitory signal and that includes instructions executable by the processor to receive data representing input to computer simulations by plural simulation players. The instructions are executable to input the data to a training service of a first pipeline of model generation computerized services to train plural personalized user experiences models, and to use an inference service of the first pipeline to generate the predictions of those personalized user experiences. The instructions are further executable to provide those model predictions from the inference service to an experimentation service of the first pipeline to test the recommended personalized user experiences. Still further, the instructions are executable to provide output generated by use of the experimentation service to train a new model using the training service of a second pipeline of model generation computerized services to select a subset of the personalized user experiences models from the first pipeline using at least one key performance indicator (KPI). The instructions are executable to provide this new model trained in the training service of the second pipeline to an inference service of the second pipeline to deliver recommendations of new personalized user experiences models to be trained in the training service of the first pipeline.

In examples, the instructions may be executable to learn how to classify the models selected from the first pipeline using the training service of the second pipeline, and provide those classifications to the second pipeline. In such examples, the instructions may be executable to execute a reinforcement learning model (RL) of the second pipeline to identify at least a first model from the first pipeline as a "good" model at least in part by maximizing a reward predicted for the first model. The maximizing may be executed at least in part by equating a recommendation associated with a time "t" to a reward associated with the time "t" plus a product of a discount factor and a recommendation associated with a time t+1.

In certain implementations the instructions can be executable to execute an evolution strategy model (ES) that may use the selected models classified in the second pipeline to identify future models to be trained by the first pipeline. The instructions may be executable to execute the ES to learn, based on the classifications, model meta-data, and to generate the future models at least in part based on their meta-data.

In another aspect, a system includes a first plurality of computers implementing a first pipeline for training models and inference of those models, and a second plurality of computers implementing a second pipeline for receiving the models from the first pipeline, identifying at least a first model among the models from the first pipeline as being a good model, and feeding back a new model to the first pipeline to enable the first pipeline to generate new models.

In another aspect, a method includes model training and model inference using a first computerized pipeline, identifying at least one best model from the models deployed in the inference service of the first pipeline using a second computerized pipeline, and feeding back information associated with the best model to the first pipeline. The method includes outputting model recommendations using at least a best model among models from the first pipeline which provide computer simulation recommendations.

The details of the present application, both as to its structure and operation, can best be understood in reference to the accompanying drawings, in which like reference numerals refer to like parts, and in which:

DETAILED DESCRIPTION

Figure 1:
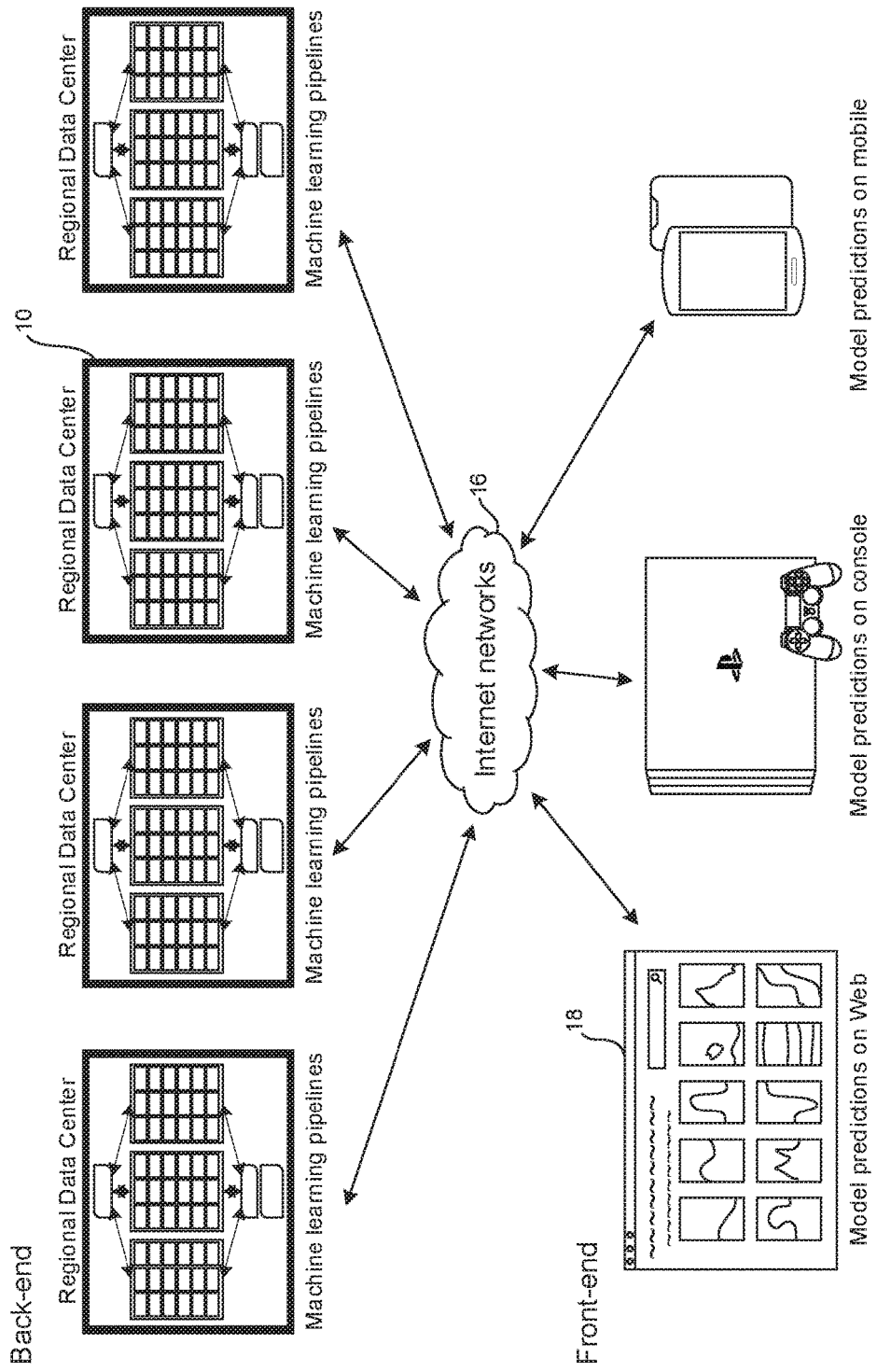
FIG. 1 is a block diagram of a network architecture of a cloud-based machine learning platform consistent with present principles.

This disclosure relates generally to computer ecosystems including aspects of consumer electronics (CE) device networks such as but not limited to distributed computer game networks, augmented reality (AR) networks, virtual reality (VR) networks, video broadcasting, content delivery networks, virtual machines, machine learning, and artificial neural networks applications.

A system herein may include server and client components, connected over a network such that data may be exchanged between the client and server components. The client components may include one or more computing devices including AR headsets, VR headsets, game consoles such as Sony PlayStation® and related motherboards, game controllers, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more programs/applications, such as a browser made by Microsoft or Google or Mozilla or other browser program that can access websites hosted by the Internet servers discussed below. Also, an operating environment according to present principles may be used to execute one or more computer game programs/applications and other programs/applications that undertake present principles.

Servers and/or gateways may include one or more processors executing instructions that configure the servers to receive and transmit data over a network such as the Internet. Additionally, or alternatively, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or video game website to network users to communicate crowdsourced in accordance with present principles.

As used herein, instructions refer to computer-implemented steps for processing information in the system. instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

As indicated above, present principles described herein can be implemented as hardware, software, firmware, or combinations thereof; hence, illustrative components, blocks, modules, circuits, and steps are set forth in terms of their functionality. Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor discrete hardware components, or any combination thereof designed to perform the functions described herein. A processor can be implemented by a controller or state machine or a combination of computing devices.

The functions and methods described below may be implemented in hardware circuitry or software circuitry. When implemented in software, the functions and methods can be written in an appropriate language such as but not limited to Python, Scala, Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now referring to FIG. 1, an example system is shown, which may include one or more of the example devices mentioned herein in accordance with present principles to execute techniques described in this document. As shown, a system may include one or more regional data centers 10 each of which includes one or more servers with attendant processors and solid state memories and disk memories. The servers establish a cloud-based system for executing the above-described machine learning platform in which machine learning models are executed on multiple data centers. The regional data centers communicate via wired and/or wireless links 16 with one or more computerized front-end devices 18 such as a computer (laptop, PC, etc.) executing a Web browser, a mobile application executing on a mobile device, or a computer simulation console such as a game console.

Thus, as shown in FIG. 1, the dual machine learning pipelines are provided from the "cloud". The machine learning pipelines execute over a large number of computer clusters in the cloud back-end hosted by the regional data centers 10. All model training and model inferences happen in the back-end. The model predictions are provided to a front-end application such as any of the front-end applications running on the devices 18 including a Web browser, a game console, or a mobile application. All front-end applications communicate to the cloud back-end over Internet networks 16. Each cluster might include a large number of computer servers located physically on one or multiple server farms located into one or multiple data centers that are geographically distributed.

A typical architecture may include a large number of regional data centers distributed over the world with one or multiple regional data centers located in North America, Europe Middle East and Africa, Japan, and the rest of the world.

Figure 1A:
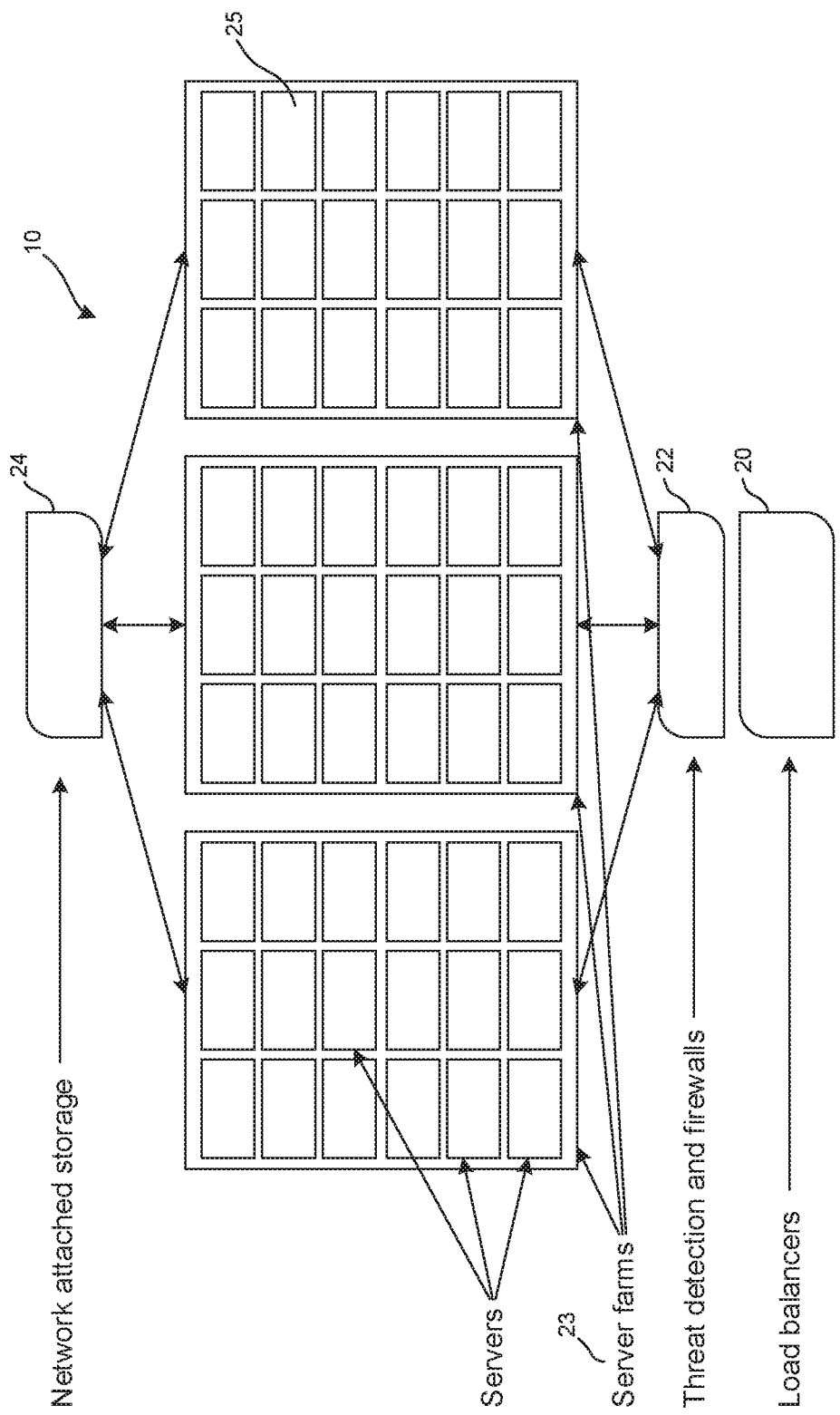
FIG. 1A is a block diagram of a data center architecture consistent with present principles.

As shown in FIG. 1A, each data center may include one or multiple load balancers 20 to manage the network requests from the front-end applications 18 and to plural server farms 23 and one or multiple threat detection and firewall appliances 22 to protect servers 25 from external security threats. Although most of the data is in motion and generated and may be stored in large file systems such as the Apache Hadoop Distributed File System (RDFS) in various data formats such as Apache Parquet that can easily be accessed and manipulated by. the clusters in the server farms, some data might be at rest and stored physically on network attached storage devices (NAS) 24 in the data center.

Present principles completely automate the machine learning pipeline. Not only is the automation horizontal e.g., the pipeline automates the workflows from model training to model inference and from model inference to model experimentation, but also the automation is vertical, e.g., there is no need to have teams of data scientists who decide which model to train, which model to deploy in production, and which model to experiment.

As shown in the figures and described more fully below, the development of machine learning models includes a number of workflows, including getting and preparing the data, feature engineering and ETLs, designing models, training models on large server clusters located in data centers that provide the machine learning cloud service, evaluating model performance and latency, and deploying model as a service in production.

To that end, as shown in FIGS. 2-5, two machine learning pipelines, referred to as P1 and P2, provide model training and model inference without human intervention. The first pipeline P1 generates models for personalizing game player experiences.

Figure 2:
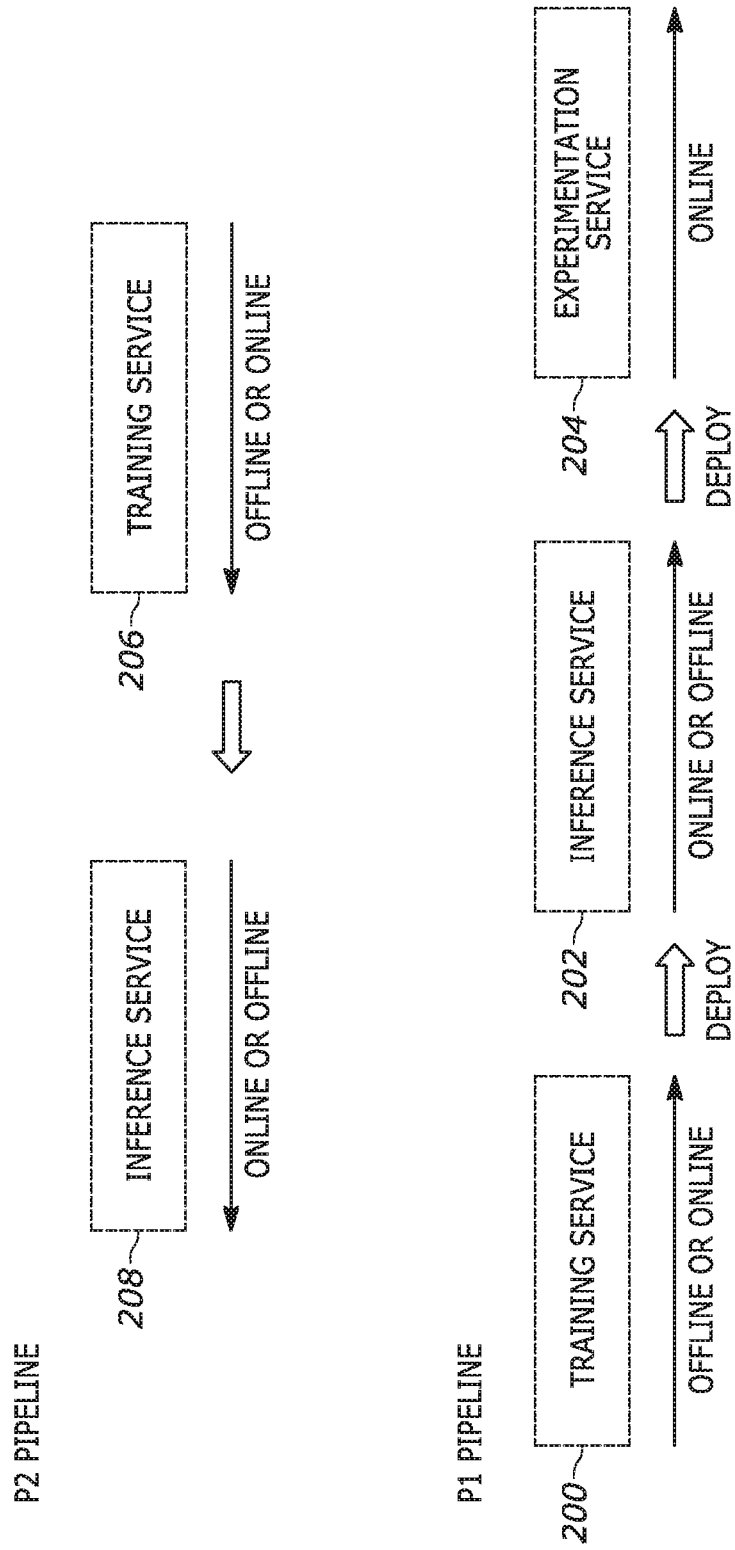
FIG. 2 is a schematic diagram illustrating the automated workflows of the dual machine learning pipeline.

As illustrated in FIG. 2, the first pipeline P1 includes a training service 200 that may be online or off-line. The training service 200 in some embodiments includes plural computers arranged in a distributed computer architecture that provides parallel processing of computationally-intensive training using large datasets. As indicated at in FIG. 3, the training service 200 of the first pipeline P1 employs one or more computers executing machine learning algorithms to learn how to provide recommendations for personalized game experiences. The training service 200 provides a feature generation ETLs service, and a model training service that leverages distributed computing architectures to parallelize computational-intensive training jobs with large data sets.

The first pipeline P1 also includes an online or off-line inference service 202. The inference service 202 includes plural computers arranged in a high-performance architecture to ensure a lowest deterministic latency of model predictions. In other words, the inference service 202. rapidly processes trained models from the training service 200 as further amplified below. As indicated at 302 in FIG. 3, the inference service 202 provides model predications.

Figure 3:
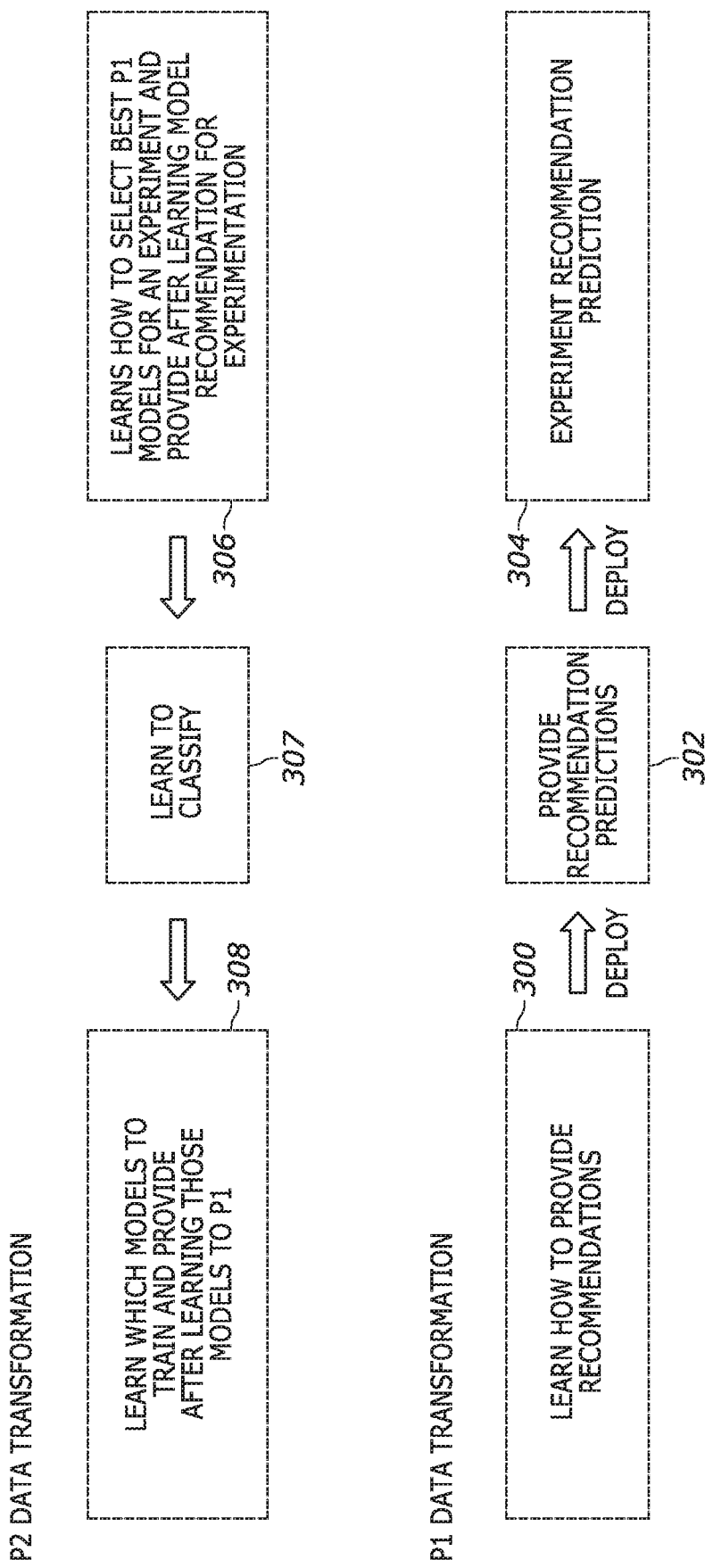
FIG. 3 is a schematic diagram illustrating the data transformations running on the two pipelines.

The model predictions of the inference service 202 are sent to an experimentation service 204 in the first pipeline P1 to experiment those predictions as indicated at 304 in FIG. 3. The experimentation service 204 includes computers with output devices that provide user interfaces to define the experiment hypothesis, and to input the experiment's key performance indicators (KPIs) and metrics.

The output of the first pipeline P1, which includes meta-data about the models while being trained and in inference, and the meta-data about the features being generated from the CTLs, is sent to an off-line or online training service 206 in second P2 pipeline as shown in FIG. 2. As described further below, a reinforcement learning model (RL) learns in the training service 206 of the P2 pipeline how to select the "best" models from the P1 pipeline for experimentation as indicated at 306 in FIG. 3.

Classification is learned at state 307 as further explained below the output of which is sent to an online or off-line inference service 208 in the P2 pipeline which employs one or more computers executing machine learning algorithms to be used by various models described further below to learn which models to train and provide as indicated at 308 in FIG. 3, indications of which are fed back to the training service 200 of the P1 pipeline.

The P2 pipeline accordingly has both a training service and an inference service. Both of those services are used by three P2 models to be shortly described, namely, the RL model plus a CL model and an ES model. Each model uses the training and inference service in order to be trained and in order to provide its predictions. For example, the RL model selects the best models, the CL model classifies the model selected by the RL model, and the ES model recommends models to the first pipeline P1 to be trained. Thus, the RL model gives its predictions to the CL model which in turn gives its predictions to the ES model. The ES model gives its predictions to the first pipeline P1.

Thus, it may be appreciated that the second pipeline P2 generates models that help P1 to generate better models.

With the above in mind, it may be further appreciated that the data transformation in the first pipeline P1 can be considered as a data plane of an overall machine learning pipeline which includes both pipelines P1 and P2, while the second pipeline P2, which optimizes the data transformation from the first pipeline P1, can be considered as the control plane of the overall machine learning system. In effect, the second pipeline P2 is an overlay to the first pipeline P1.

As explained further below, models from the first pipeline P1 are trained with recommender system techniques to provide personalized user experiences such as logistic regression, matrix factorization, factorization machines, deep learning, and reinforcement learning. Models from the second pipeline P2 are trained with reinforcement learning, clustering, and evolution strategy techniques.

With respect to the experimentation service 204 of the first pipeline P1, a large number of models are subject to experiments to test multiple personalized recommendations to different user segments to evaluate the user responses to those various types of recommendations. The system can provide a large number of experiments simultaneously or sequentially. Each experiment can also have multiple variants. Each experiment generally focuses on testing a specific hypothesis such as a user segmentation, game feature, context of the recommendation, or environment for the recommendation. The variants may, if desired, be run simultaneously. Multiple models can be proposed, each providing a personalized recommendation, for each variant. All models for a given experiment should output their recommendations in a given time interval, It is also desirable that the system scale-up well to provide simultaneously multiple experiments online which have multiple variants, and for which multiple models can be proposed. Note that the requirements for scale can vary at any time depending on the volume and velocity of the data for the experiment.

Figure 4:
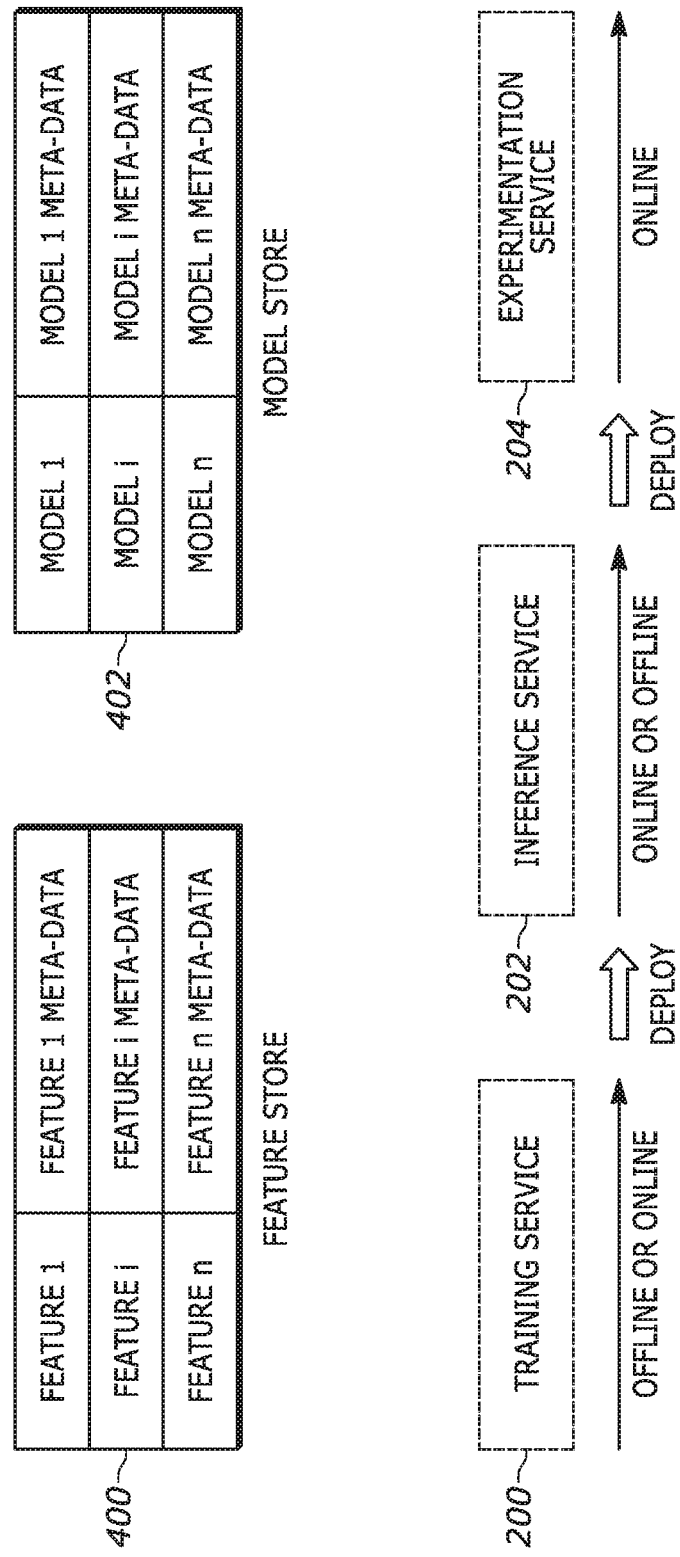
FIG. 4 is a schematic diagram illustrating the feature meta-data stored in a feature store, and the model meta-data stored in a model store of the first pipeline PT.

A successful experimentation hypothesis may be quantitatively measured by a key performance indicator (KPI). in general, one primary KPI which is a relevant long-term business goal is chosen. That primary KPI can have multiple secondary metrics to capture the full scope of the experiment in order to analyze what did happen and why it happened. Secondary metrics may be used in general by the experiment product analyst to deliver further analyses on the experiment to marketing analysts. FIG. 4 provides additional details of the pipelines described above relating to feature and model meta-data. The first pipeline P1 generates and deploys models in production and for experimentation, and "horizontally" automates the end-to-end machine learning workflows. As shown in FIG. 4, the training service 200 of the first pipeline generates the feature meta-data in a feature data store 400, and the training service 200 and the inference service 202 generate the model meta-data in a model data store 402. Raw data such as user data, game data, and user interactions such as user-game interactions (play, purchase, view, dwell, like, comment, re-share, etc.) and user-user interactions (friend, follow, share, etc.) are used to generate the feature ETLs.

Features of the first pipeline P1 can be generated off-line from the data in the data stores or online when the data is streamed from a publish and subscribe feed.

As discussed above, the training service 200 of the first pipeline P1 generates feature ETLs for personalized game experiences models to the inference service 202. The training service 200 trains those personalized game experiences models online or off-line and deploys them in a production environment in the inference service 202.

After models are trained in the training service 200, the inference service 202 of the first pipeline P1 provide inferences of personalized game experience models, afterward those models are then ready for experimentation in the experimentation service 204. Note that the first pipeline P1 can provide model predictions online, when an online application requests the predictions in real-time, or off-line and have those predictions available in a data store for an off-line application.

The first pipeline P1 generates the models and features meta-data. The feature meta-data are generated after each ETI, is generated in the pipeline. The model meta-data are generated after the model is trained in the training service 200, and after it provides its predictions in the inference service 202.

The model meta-data alluded to above can include the model algorithm, model architecture (in particular for deep learning models such as convolutional neural networks (CNN) or recurrent neural networks (RNN)), model parameters or weights, model hyperparameters, model learning rate, and model features. The meta-data can also include information regarding dependencies on such as when the training or the prediction of a model is dependent on one or many other models, the state of the model prediction in inference as the model can provide online or off-line model inferences, and standard algorithm metrics such as (for a regression) root mean squared error and (for a classification) precision, recall, and F1 score (the harmonic mean of precision and recall).

Furthermore, the model meta-data may include relevancy of the prediction for the recommendation as measured by a metric such the "WPAE" metric set forth in the present assignee's U.S. patent application Ser. No. 16/424,193 incorporated herein by reference.

On the other hand, feature meta-data can include standard statistical metrics (mean, average, maximum, minimum, and standard deviation) and the features' relationships with other features and models.

As discussed above, the second pipeline P2 helps the first pipeline P1 to produce better models by "vertically" automating the end-to-end machine learning workflows by helping P1 to generate better models. In general, the second pipeline P2 learns how to select the best models for an experiment from the experiment KPIs through reinforcement learning. Models are classified per experiment. The second pipeline P2 also learns how to recommend which model the first pipeline P1 should train by recommending the model meta-data through an evolution strategy, and how to select the best models for an experiment from the experiment KPI through reinforcement learning.

Figure 5:
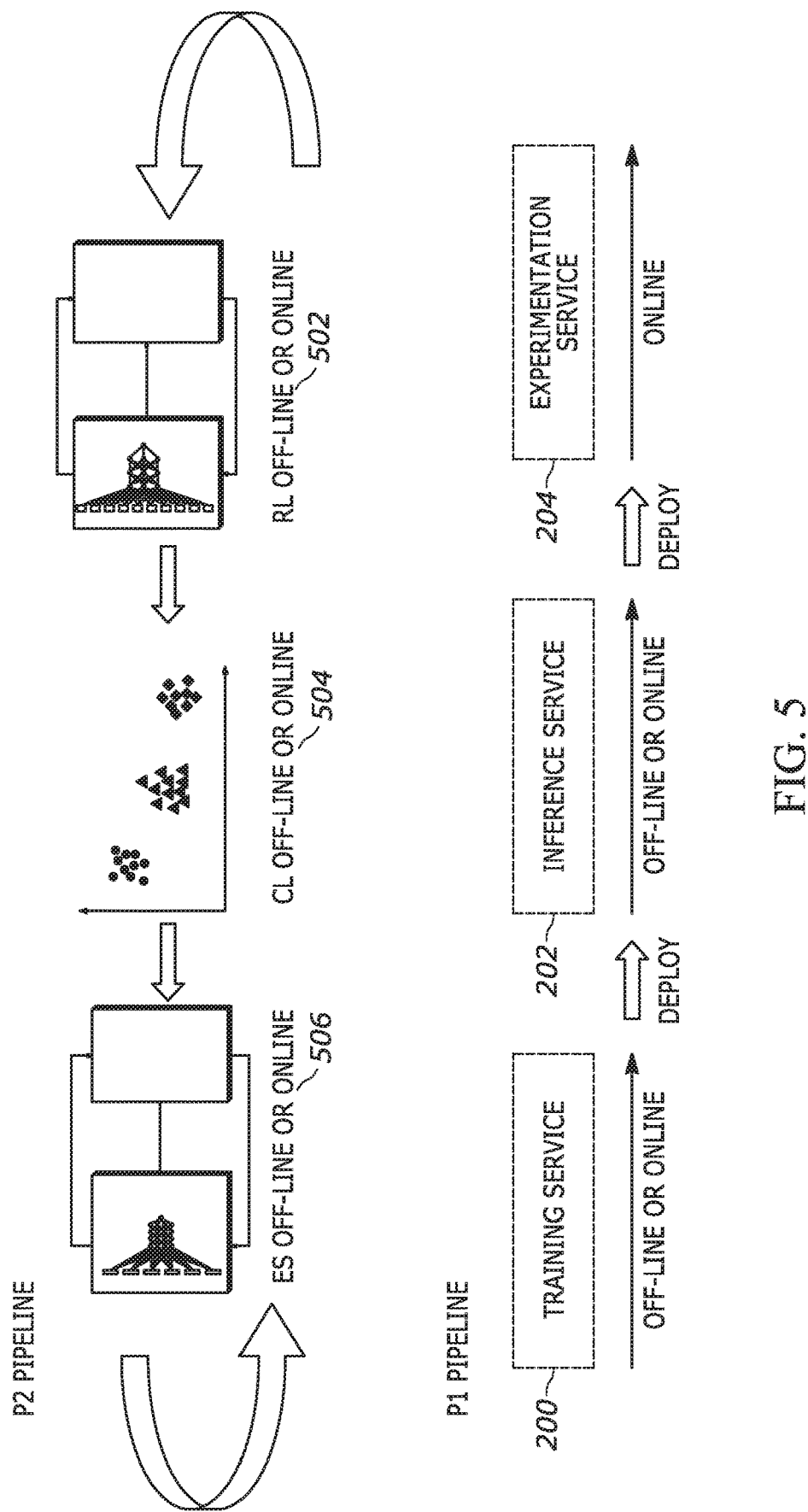
FIG. 5 is a schematic diagram illustrating the flow of the communication between the two pipelines using the RL, CL, and ES models.

FIG. 5 illustrates further. The training service 206 and the inference service 208 of the second pipeline P2 may be used by an online or off-line reinforcement model (RL) 502 providing a first data transformation. Also, a second data transformation (classification at 307 above) is provided by a clustering model CL 504, while a third data transformation is provided by an evolution strategy model ES 506, and both of those data transformations are provided in the training service 206 and the inference service 208 described above.

The RL 502 analyzes among models in production from the first pipeline P1 the best performing one for an experiment. in example non-limiting embodiments, reinforcement learning may be implemented as described in "Playing Atari with Deep Reinforcement Learning" published in www.arXiv.org, with the following number 1312.5602, by Mnih et al., disclosed in the instant file history, and incorporated herein by reference.

The first pipeline P1 shares with the RL 502 of the second pipeline P2 all its models deployed in its product environment for inference. And, for each model, the RL 502 can access the model meta-data. The first pipeline P1 also shares with the RL 502 of the second pipeline P2 each experiment run on its experimentation service, and in particular the experiment KM and the number of variants.

The RL 502 analyzes among models in production from the first pipeline P1 the best performing one for an experiment. In an embodiment, the RL 502 uses a Markov decision process (MDP) defined by the following parameters:

RL's environment is an experiment, RL's action is the selection of a model for the experiment variant, RL's state is the state in its selection of model for the experiment, RL's reward is measured by increasing the experiment's KPI, RL's policy is recommending the model that generates the highest KPI for the experiment, and Q-value is the expected cumulative reward from selecting a model for each variant of a given experiment.

The model selection of the RL 502 of the second pipeline P2 maximizes the discounted future reward from time point t onward as expressed by:

$$R_t = r_t + r_{t+1} + \ldots + r_{t+i} + \ldots + r_{t+n}$$

Assuming $\gamma$ is the discount factor chosen to find the right balance between exploration (e.g. taking an immediately suboptimal action to gather additional experiment information) and exploitation (e.g. maximizing future reward), the discounted future reward can be expressed as:

$$R_t = r_t + \gamma R_{t+1}$$

Figure 6:
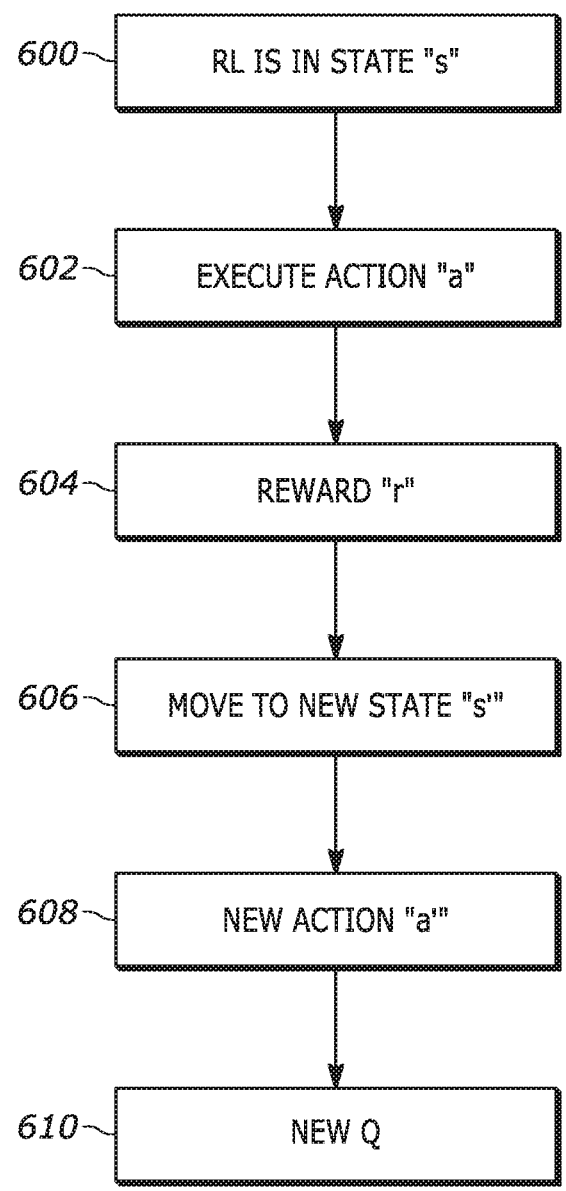
FIG. 6 is a flow chart of example logic pertaining to the RL model algorithm.

Referring briefly to FIG. 6 to explain the RL 502, at block 600 it is assumed that RL's agent is in the state "s". Moving to block 602, an action "a" is executed in that state. Proceeding to block 604, a reward $r_t$ is observed from its action a, at block 606 RL is moved to a new state "s'" that generates a new action "a'" at block 608 to obtain, at block 610, a new Q-value, in one implementation according to the equation:

$$Q(s, a) = r_t + \gamma \max_{a'} Q(s', a')$$

As a result, the Q-learning algorithm may be stated as:
initialize Q (s, a) arbitrarily, observe initial state s, repeat, select and carry out an action a, observe reward r and new state's Q(s, a)=Q(s, a)+$\alpha$($r_t$+$\gamma$ max a'Q(s', a')–Q(s, a)), s=s' until terminated.

In the above equation, "$\alpha$" denotes the learning rate which controls how much of the difference between the previous Q-value, and the newly proposed Q-value is taken into account. The Q-values of the RL 502 may be estimated leveraging a function approximator that implements the deep -teaming algorithm. The function approximator can be, for example, a deep Q-network such as a deep learning system with parameters $\theta$ such that:

$$Q(s, a; \theta) \sim Q(s, a).$$

The deep Q-network can be a deep neural network with three hidden layers and ten features. The features of the neural network can be the model meta-data as defined previously, namely, Model algorithm, Model architecture. Model parameters, Model hyperparameters, Model features, Model learning rate, Model dependencies, State of the inference, Model metrics, Model WPAE, The output of the neural network is the Q-value: Q (s, a), It is to be understood that the loss function for the training of the network maybe given by:

$$L_i(\theta) = \mathbb{E}[(y_i - Q(s, a; \theta_i))^2]$$

where $\mathbb{E}$ is the expected value
and where $y_i = \mathbb{E}[r_t + \gamma \max_{a'} Q(s', a'; \theta_{i-1})]$
And the gradient update to the training parameters $\theta_i$ of the network is:

$$\nabla_{\theta_i} L_i(\theta_i) = \mathbb{E}[(r_t + \gamma \max_{a'} Q(s', a'; \theta_{i-1}) - Q(s, a; \theta_i)) \nabla_{\theta_1} Q(s, a; \theta_i)]$$

The network parameters OT may be initialized randomly.

The deep Q-network can be trained with experience replay that stores all the transitions (s, a, r, s'). When training the network, random samples from the replay memory are used instead of the most recent transitions.

With experience replay, the Q-network algorithm becomes:
initialize replay memory M;
initialize the Q-value function with random weights;
observe initial state "s";
repeat;

select an action "a" by selecting a random action with probability ε, otherwise
   select a=arg max a' Q(s, a'),
   carry out action "a";
   observe reward r and new state s';
   store experience (s, a, r, s') in replay memory M;
   sample random transitions (ss, aa, rr, ss') from replay memory M;
   calculate target for each minibatch transition;
   if ss' is terminal state then uu=rr, otherwise uu=rr +γ max a'Q(ss', aa');
   train the Q-network using (uu−Q(ss, aa))² as loss;
   s=s'
   until terminated The deep -network selects the best model from the first pipeline for a given experiment. If multiple variants are required by the experiment product analyst, after one model has been selected from the models available in production in the first pipeline P1, the deep Q-network selects the best model from the remaining models, The number of variants can be input by the experiment product analyst in the user interface of the experimentation service 204 of the first pipeline P1.

Figure 7:
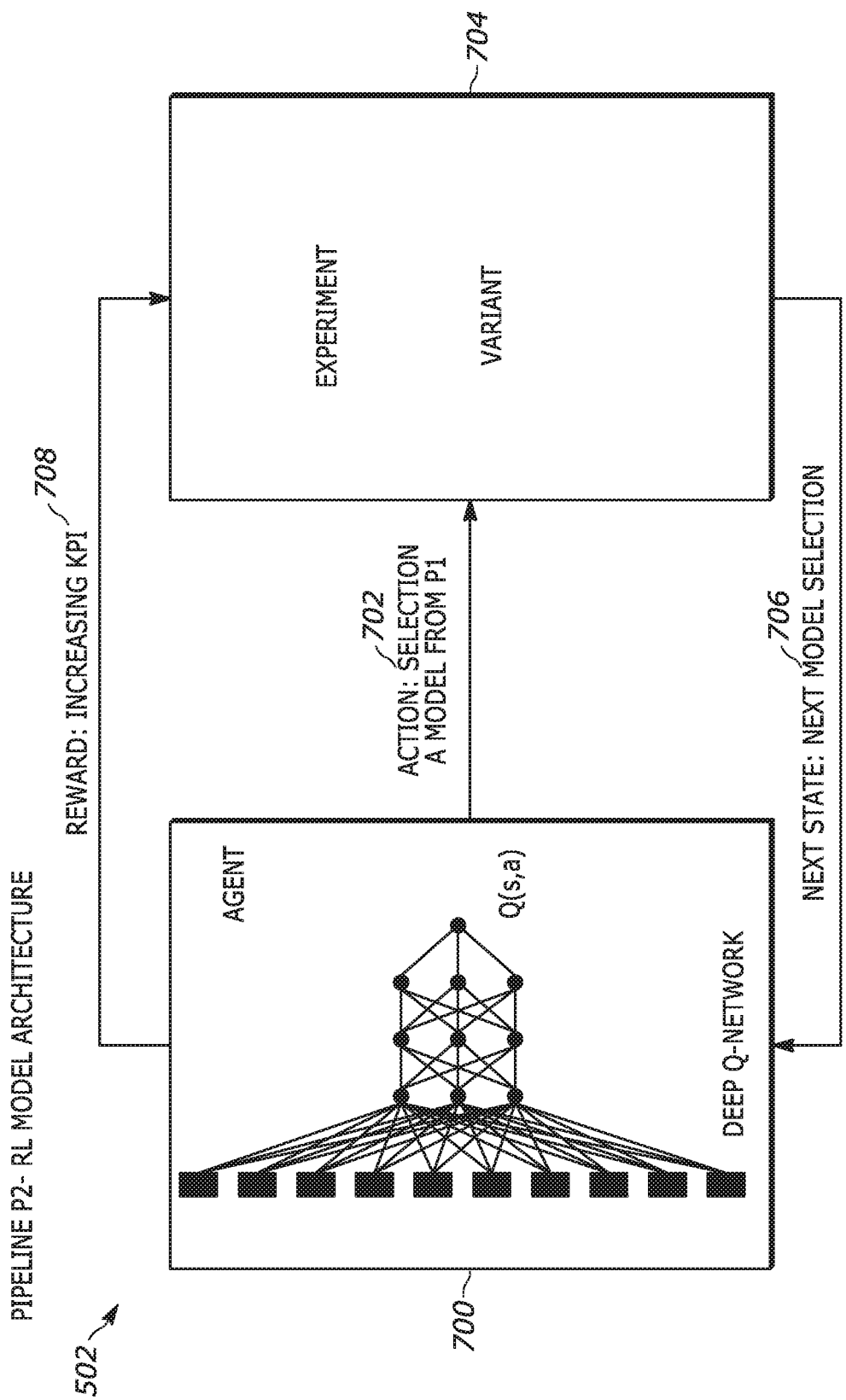
FIG. 7 is a schematic diagram illustrating the RL model architecture of the second pipeline P2.

FIG. 7 illustrates details of a RL 502 architecture example. As shown, the RL agent, a deep Q-network 700, selects a model 702 from the first pipeline P1 for a particular valiant 704 of an experiment. That model 702 is selected by the agent to maximize a reward 708 of an increasing KPI for the variant 704. And as a result, the RL agent 700 moves to a new state with a new model selection 706.

Figure 8:
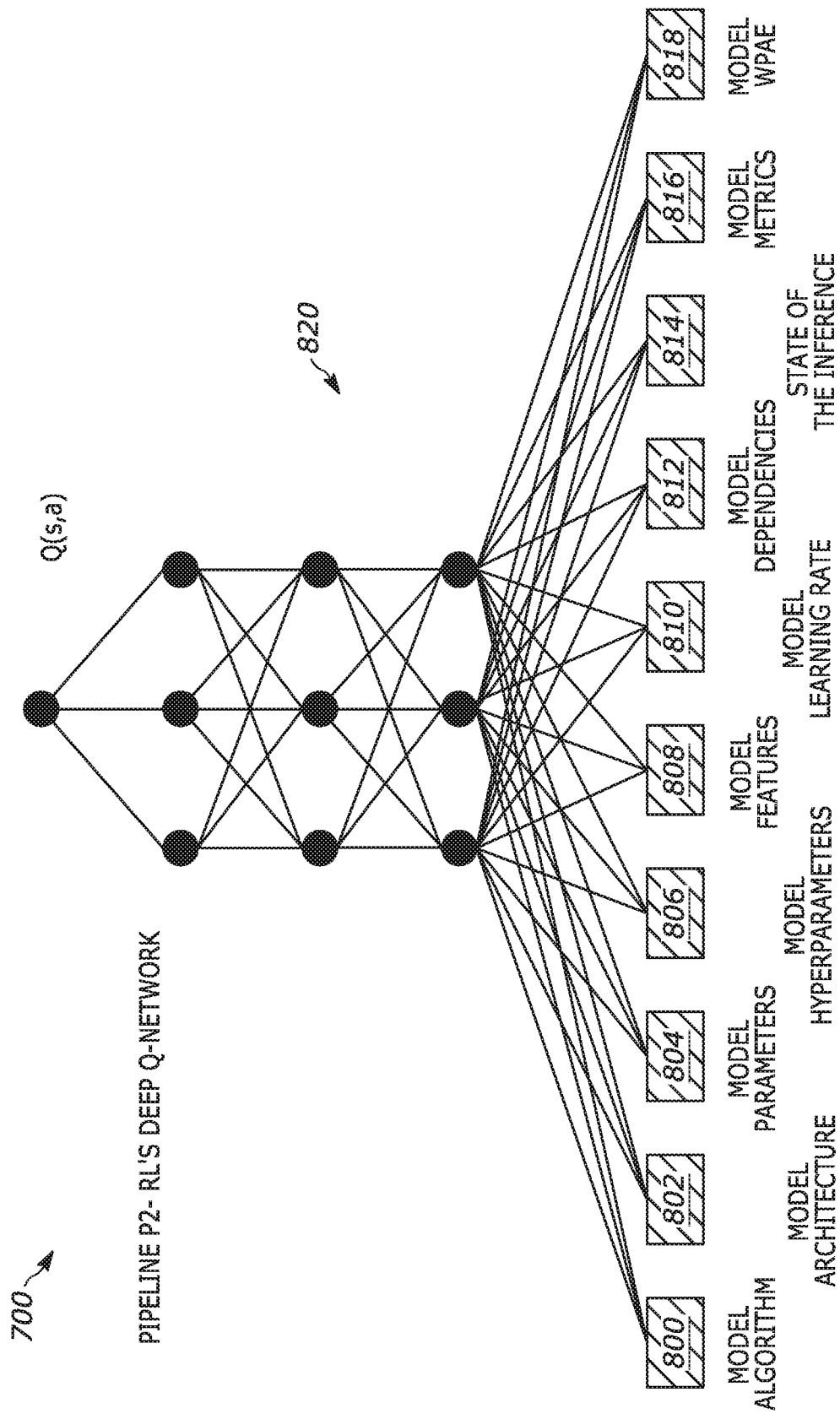
FIG. 8 is a schematic diagram illustrating the RL deep Q-network.
Figure 9:
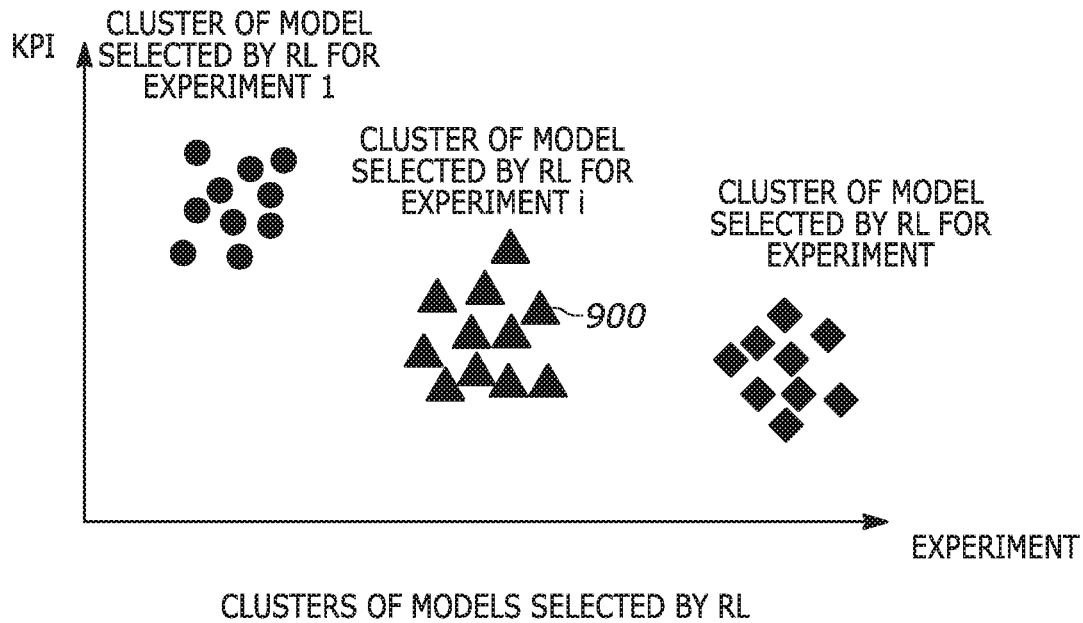
FIG. 9 is a schematic diagram illustrating the classification of models provided model CL in the second pipeline P2.

FIG. 8 schematically illustrates the deep Q-network 700 of FIG. 7. As discussed above, Model algorithm 800, Model architecture 802, Model parameters 804, Model hyperparameters 806, Model features 808, Model learning rate 810, Model dependencies 812, State of the inference 814, Model metrics 816, and Model WPAE 818 are provided to the network 700 for processing as described above by the deep learning layers 820, The RL: 502 of the second pipeline P2 is chained to an evolution strategy model (ES) 506 of the second pipeline P2 by a classification model (CL) 504 for classifying model meta-data per experiment. As illustrated in FIG. 9, the CL 504 clusters the best performing models selected by the RL 502 per type of experiment 900, from lowest to highest KPI as indicated by the y-axis in FIG. 9. Classification may be performed by a clustering algorithm such as K-means or hierarchical clustering.

The ES 506 in turn learns how to recommend which model to train by recommending the model meta-data through an evolution strategy. The ES model 506 learns from the models classified by the CL 504 per experiment how to recommend to the training service 200 of the first pipeline P1 which new models to train. To that end the ES 506 samples the population of models classified by the CL 504 and allows the best performing models to dictate the distribution of future generations of models that the first pipeline P1 shall train.

The ES 506 learns how to generate a new model from each model meta-data selected by the RL 502 for an experimentation, and in particular how to recommend the model features, recommend the model algorithms, recommend the model architecture in particular for deep learning models, recommend the model parameters, hyperparameters, and learning rate, recommend model dependencies to other models, and recommend if the model inference is off-line or online.

Evolution strategy techniques differ from reinforcement learning techniques as they do not compute a Q-value to find the policy that will generate the highest reward, and the evolution strategy deep learning system is trained without backpropagation. In examples, evolution strategy may be implemented using the principles in "Evolution Strategies as a Scalable Alternative to Reinforcement Learning" published in www.arXiv.org, with the following number 1703.03864 Salimans et al., disclosed in the instant file history, and incorporated herein by reference.

Figure 10:
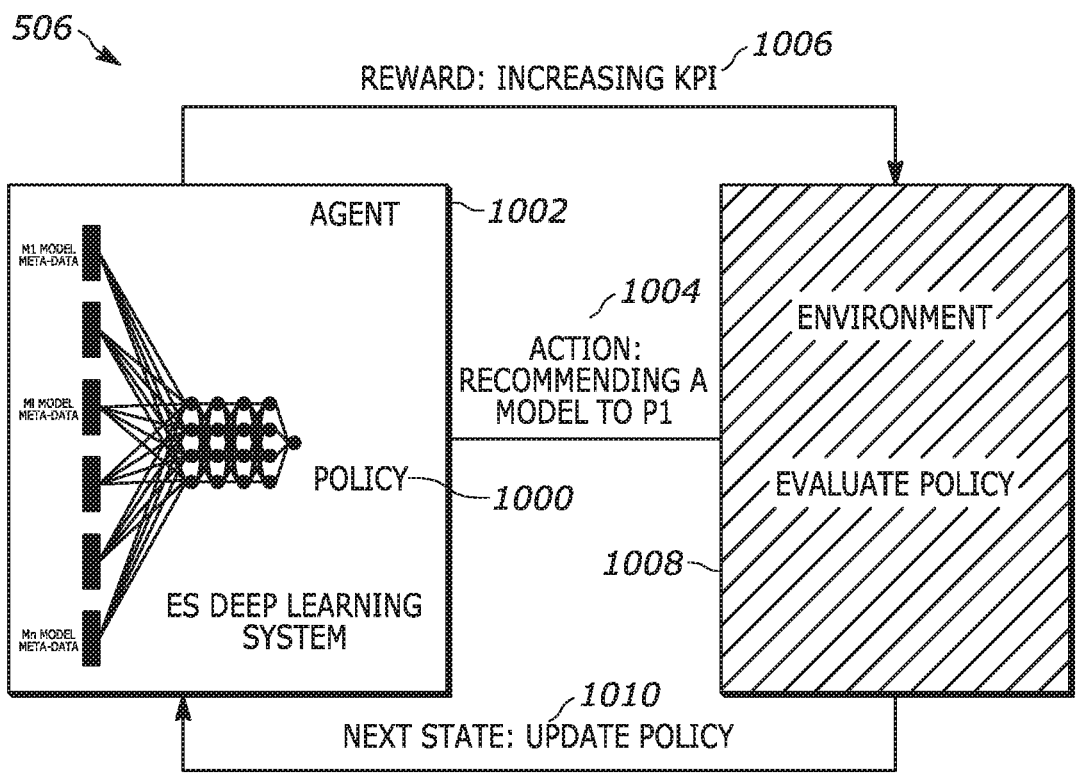
FIG. 10 is a schematic diagram illustrating the ES model architecture of the second pipeline P2.
Figure 11:
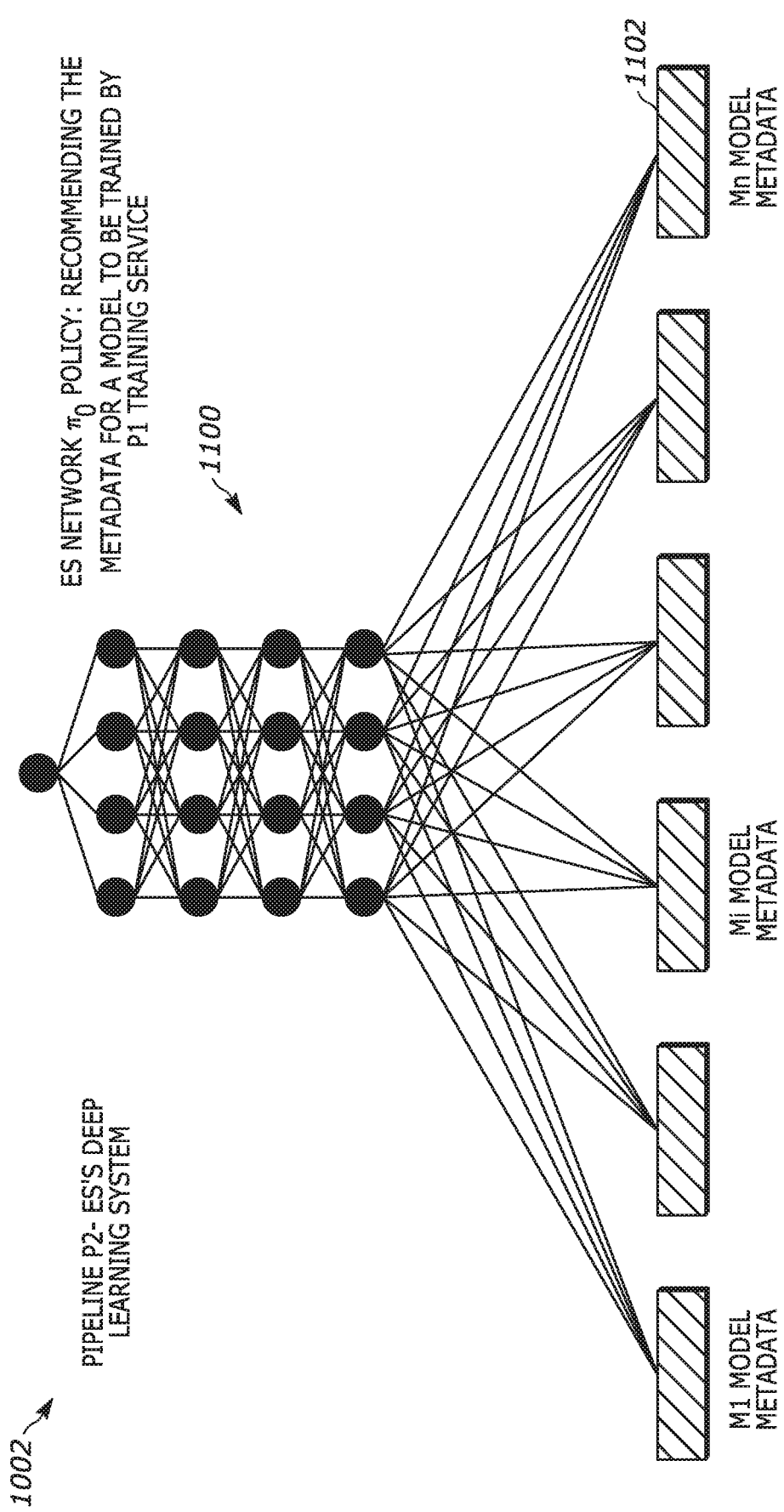
FIG. 11 is a schematic diagram illustrating the ES deep learning system.

FIGS. 10 and 11 illustrate details of example implementations of the ES 506. The ES 506 learns from the model meta-data for each model classified by the CL 504 for a given experiment how to generate a new model meta-data. This forms the basis for an initial policy 1000 of an ES agent 1002 which may be implemented by a deep learning system. After acquiring that initial policy, the ES 506 generates new models defined by their new meta-data that can provide the same or better experiment KPI.

With greater specificity and as shown in FIG. 10, the ES deep learning system may be an agent 1002 whose action 1004 is to recommend a model to the first pipeline P1 based on a policy 1000. The agent 1002 is rewarded as indicated at 1006 if the policy increases successfully the reward defined by the experiment KPI. The policy is evaluated by an evaluation module 1008, which updates 1010 the policy, and feeds this information back to the agent 1002.

As described earlier, the RL 502 works by leveraging its deep-Q network to find the policy that will maximize the experiment KPI by computing the Q-value through exploration and exploitation. In contrast, given an initial policy, the ES 506 generates a population of new policies by applying random perturbations to the weights of its deep learning network. It then evaluates all these new policies, calculating a stochastic gradient estimate to pursue which policy looks more promising to generate the highest reward.

Accordingly turning to FIG. 11, the ES 506 can be modeled with a deep learning system 1100 with four hidden layers. The input to the ES 506 can include the meta-data 1102 of each model classified by the CL 504 for each experiment. The ES 506 outputs the meta-data of a new model that the training service 200 of the first pipeline P1 then trains.

ES policy, denoted $\pi_\theta$, recommends a model meta-data to the training service 200 of the first pipeline P1 Leveraging that model meta-data, the training service 200 of the first pipeline P1 trains a new model generated from that meta-data.

Assuming F is the objective function, $\pi_\theta$ the ES policy, $\theta_i$ the parameters of ES deep learning system, ε samples drawn from the policy $\pi_{74}$, with a standard deviation σ, we have:

$$\mathbb{E}_{[F(\theta_i)]} = \mathbb{E}_{[F(\theta_i + \sigma\varepsilon)]}$$

where $\theta_i$ is optimized using stochastic gradient ascent with the following score function estimator:

$$\nabla_{\theta_j} \mathbb{E}_{\varepsilon \sim N(0,I)}[F(\theta_i + \sigma\varepsilon)] = \frac{1}{\sigma}\mathbb{E}_{\varepsilon \sim N(0,I)}[F(\theta_i + \sigma\varepsilon)\varepsilon]$$

As a result, the ES algorithm includes inputs including initial ES policy parameters $\theta_i$, an objective function F, policy samples r population size n, standard deviation σ, and ES learning rate α. The algorithm may be stated as:

for t=0,1,2, . . . do
  sample the policy;
    sample $\varepsilon_1, \ldots \varepsilon_n \sim N(0,I)$
  evaluate the policy;
    compute returns $F_i = F(\theta_t + \sigma\varepsilon_i)$ for $i=1, \ldots, n$
  update the policy $$\text{Set } \theta_{t+1} \leftarrow \theta_t + \alpha \frac{1}{n\sigma} \sum_{j=1}^{n} F_i \varepsilon_i$$

until convergence

The ES 506 shares with the first pipeline P1 all the recommended model meta-data. In turn, the first pipeline P1 leverages that model meta-data to automatically generate the training of new models based on that meta-data. The training service 200 of the first pipeline P1 is automated so that a new model can be trained with defined model features, defined model algorithm, defined model architecture, defined model parameters, hyperparameters, and learning rate, defined model dependencies to other models, and defined model inference state as off-line or online.

The second pipeline P2 thus cooperates with the first pipeline P1 to produce better models for experimentation. At each cycle, the RL 502 selects new models with better personalized recommendations from the first pipeline P1 for experimentation. The ES 506 then learns how to define new model meta-data that will outperform the previous models selected by the RL 502 from the first pipeline P1 and shares the meta-data of the models that will maximize any experiment KPI with the first pipeline P1. The first pipeline P1 then trains the new models defined by their meta-data as recommended by the ES 506. Through a large number of experiments, the RL 502 becomes better at learning how to select the best performing models, and the ES 506 becomes better at learning how to recommend models to train to P1's pipeline. The advantageous result is that the first pipeline P1 can train models and provide model inferences with the help of the second pipeline P2, but without human intervention.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
at least one processor comprising instructions executable by the at least one processor to:
receive data representing input to computer simulations by plural simulation players;
input the data to a training service of a first pipeline of model generation computerized services to train plural recommendation models;
use an inference service of the first pipeline to generate recommendations based on recommendation models trained using the training service in the first pipeline;
provide output of the inference service to an experimentation service of the first pipeline to test the recommendations to select a subset of the models using at least one key performance indicator (KPI);
use a training and an inference service of the second pipeline to provide recommendations of at least some of the recommendation models to train;
provide the recommendations of the at least some models to train generated by the second pipeline to the training service of the first pipeline;
execute a reinforcement learning model (RL) to use the training and inference services of the second pipeline to identify at least a first model from the first pipeline at least in part by maximizing a reward predicted for the first model, wherein the maximizing is executed at least in part by equating a recommendation associated with a time "t" to a reward associated with the time "t" plus a product of a discount factor and a recommendation associated with a time t+1; and
execute at least one of the recommendation models to provide recommendations for new computer simulations to provide to players of at least one computer simulation, the computer simulations comprising computer games.

2. The apparatus of claim 1, wherein the instructions are executable to:
classify the recommendation models in the second pipeline to generate classifications.

3. The apparatus of claim 1, wherein the instructions are executable to:
execute an evolution strategy model (ES) to use the training and inference services of the second pipeline to use at least the first model identified by the training service of the second pipeline to identify future models to be trained by the first pipeline.

4. The apparatus of claim 3, wherein the instructions are executable to execute the ES to learn, based on the classifications, model meta-data; and
generate the future models at least in part based on the meta-data.

5. The apparatus of claim 1, wherein the discount factor is chosen based at least in part on taking an immediately suboptimal action and maximizing future reward.

6. A system, comprising:
a first plurality of computers implementing a first pipeline for training models and providing model predictions;
a second plurality of computers implementing a second pipeline for receiving the models from the first pipeline, identifying at least a first model of the models from the first pipeline as being a model satisfying at least one criterion, and feeding back the first model to the first pipeline to enable the first pipeline to generate new models;
identify at least the first model from the first pipeline at least in part by maximizing a reward predicted for the first model by equating a recommendation associated with a time "t" to a reward associated with the time "t" plus a product of a discount factor and a recommendation associated with a time t+1; and
execute at least one of the models to provide recommendations for new computer simulations to provide to players of at least one computer simulation, wherein the computer simulations comprise computer games.

7. The system of claim 6, wherein the first plurality of computers access instructions to:
receive data representing input to computer simulations by plural simulation players;
input the data to a training service of the first pipeline to train plural of the models;
use an inference service of the first pipeline to generate recommendations based on the models trained in the training service of the first pipeline;
provide the recommendations to an experimentation service to test the recommendations; and
provide output of the experimentation service to the second pipeline to select at least the first model using at least one key performance indicator (KPI).

8. The system of claim 7, wherein the second plurality of computers access instructions to:
provide output from use of the training service of the second pipeline to at least one module using a training and inference service of the second pipeline to provide recommendations of models to train; and
provide the recommendations of models to train to the first pipeline.

9. The system of claim 8, wherein the instructions are executable by the second plurality of computers to:
classify the models learnt by use of the training service of the second pipeline to generate classifications; and
provide the classifications to at least one model employing the inference service of the second pipeline.

10. The system of claim 9, wherein the instructions are executable by the second plurality of computers to:
execute a reinforcement learning model (RL) in the second pipeline to identify at least the first model from the first pipeline at least in part by maximizing the reward predicted for the first model.

11. The system of claim 10, wherein the instructions are executable by the second plurality of computers to:
execute an evolution strategy model (ES) in the second pipeline to use at least the first model identified by use of the training and inference services of the second pipeline to identify future models to be trained by the first pipeline.

12. The system of claim 11, wherein the instructions are executable by the second plurality of computers to execute the ES to learn, based on the classifications, model meta-data; and generate the future models at least in part based on the meta-data.

13. A method comprising:
training prediction models using a first pipeline, the first pipeline being computerized;
identifying at least a first model from the prediction models of the first pipeline using a second pipeline, the second pipeline being computerized, the identifying of at least the first model from the first pipeline being least in part by maximizing a reward predicted for the first model by equating a recommendation associated with a time "t" to a reward associated with the time "t" plus a product of a discount factor and a recommendation associated with a time t+1;
feeding back information associated with the first model to the first pipeline; and
outputting recommendations using at least a first model among the prediction models, the recommendations comprising computer simulation recommendations to provide to players of at least one computer simulation comprising at least one computer game.

14. The method of claim 13, comprising executing a reinforcement learning model (RL) in the second pipeline to identify at least the first model at least in part by maximizing the reward predicted for the first model.

15. The method of claim 14, comprising executing an evolution strategy model (ES) in the second pipeline to use at least the first model to identify future models to be trained by the first pipeline.

* * * * *